April 16, 1940.  O. SHACKELFORD  2,197,440
ANNEALING LEHR AND METHOD OF ANNEALING GLASS ARTICLES
Filed March 16, 1937  9 Sheets-Sheet 1
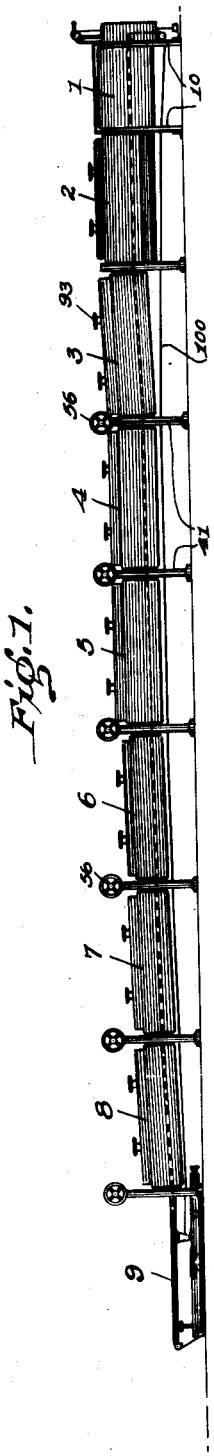
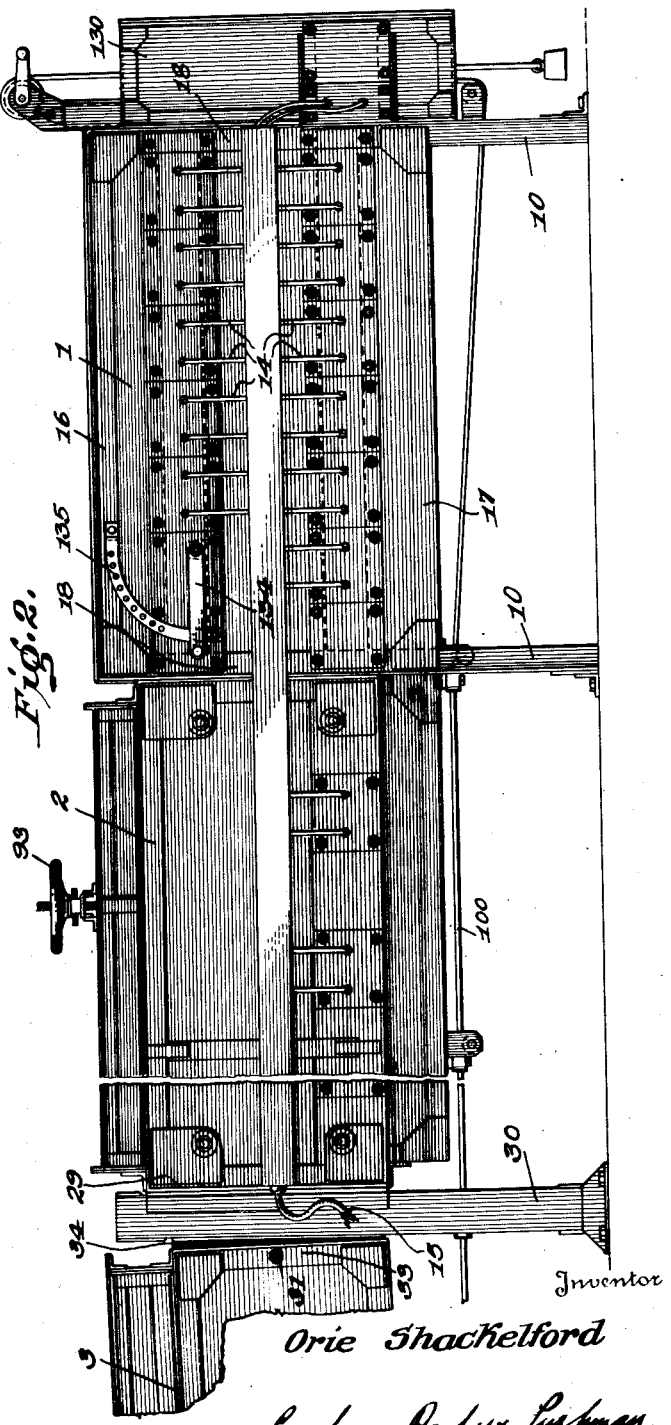
Inventor
Orie Shackelford
By Cushman Darby & Cushman.
Attorney April 16, 1940. O. SHACKELFORD 2,197,440
ANNEALING LEHR AND METHOD OF ANNEALING GLASS ARTICLES
Filed March 16, 1937 9 Sheets-Sheet 2
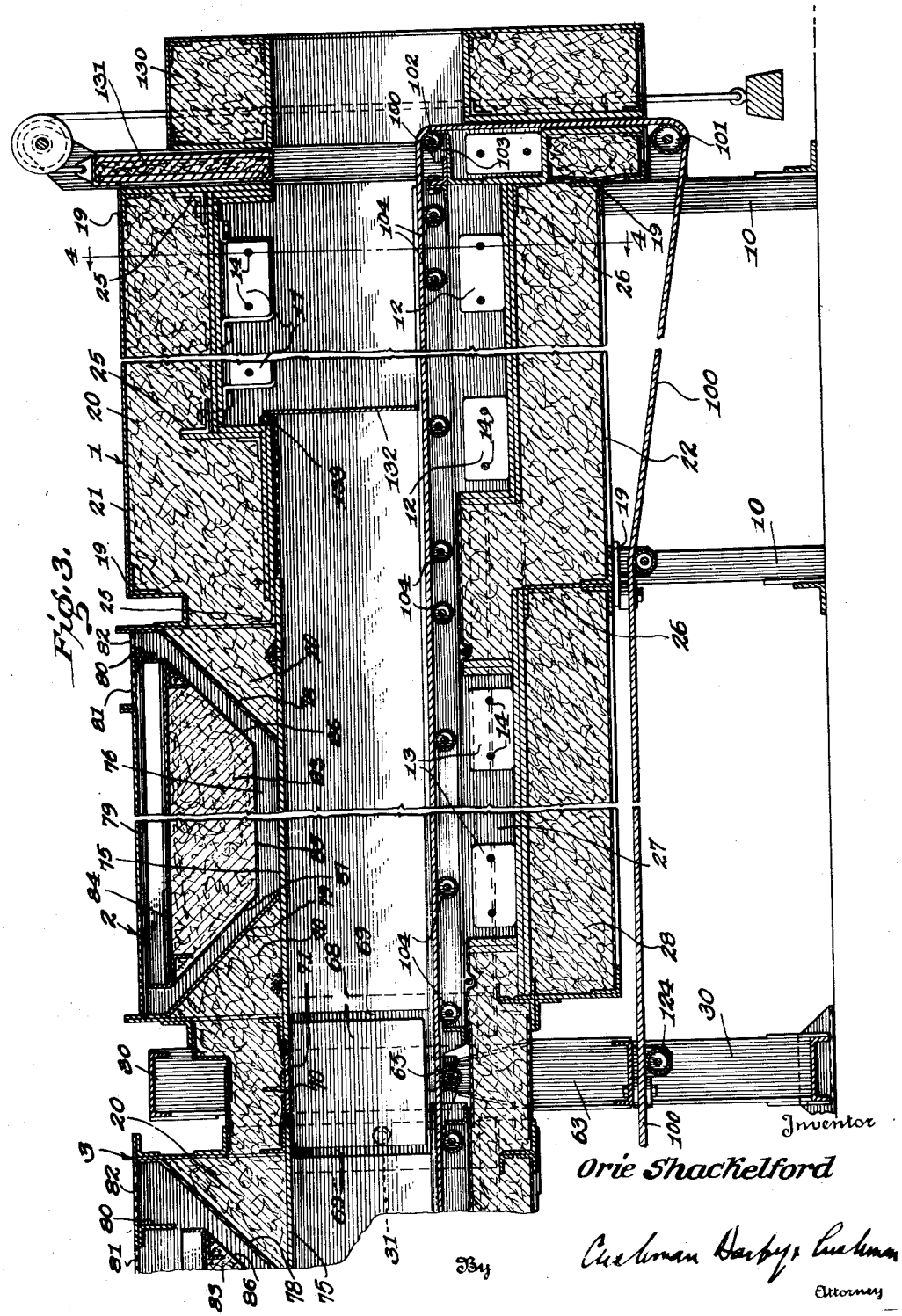
Inventor
Orie Shackelford
By Cushman Darby & Cushman
Attorney

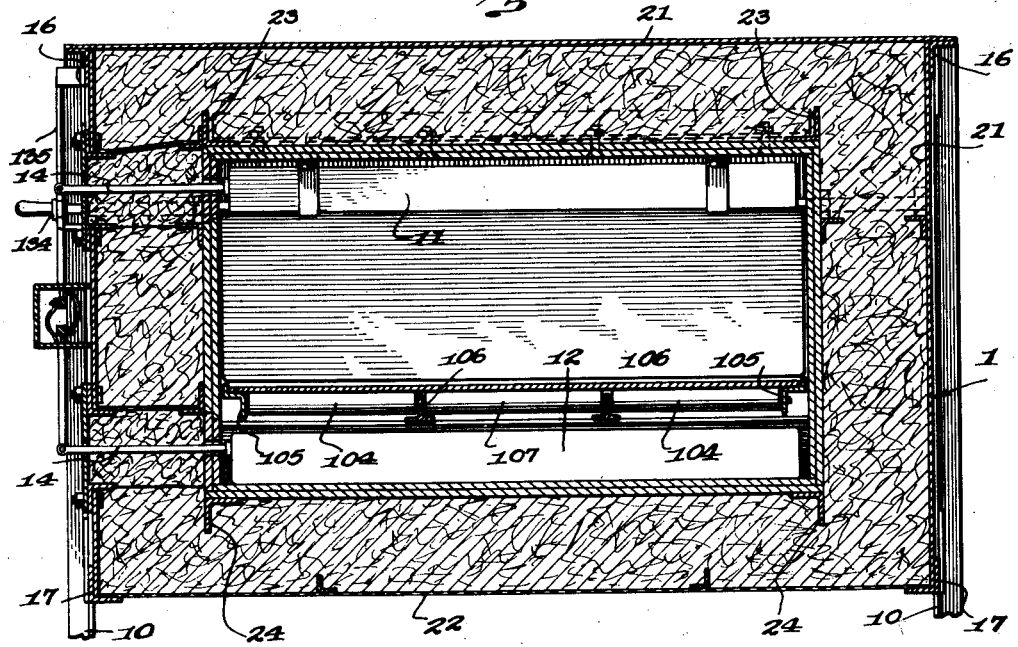
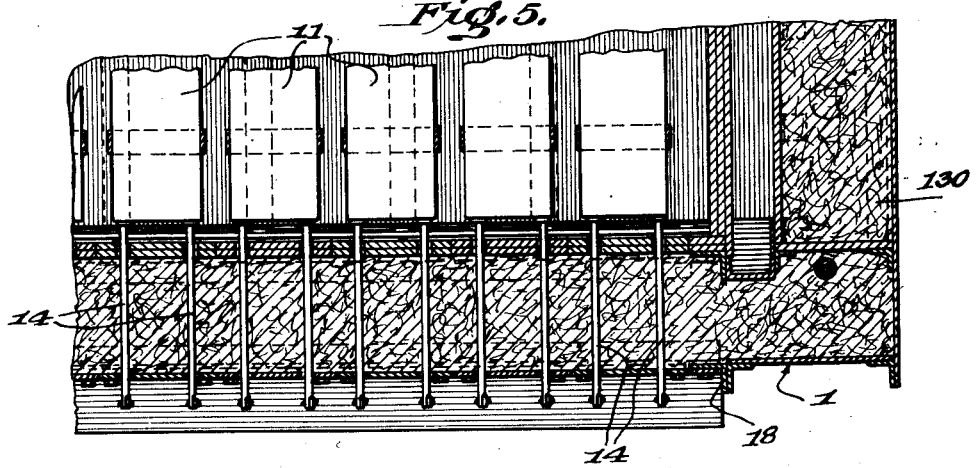

April 16, 1940.  O. SHACKELFORD  2,197,440
ANNEALING LEHR AND METHOD OF ANNEALING GLASS ARTICLES
Filed March 16, 1937  9 Sheets-Sheet 4
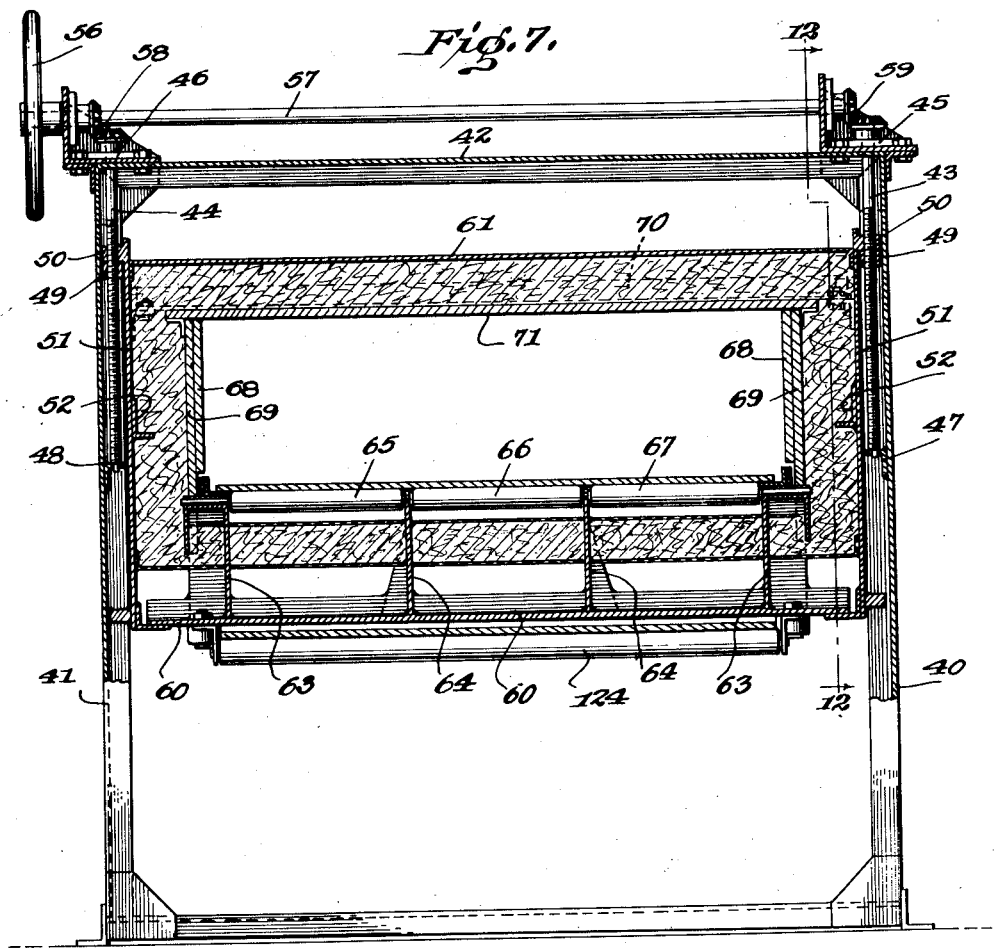
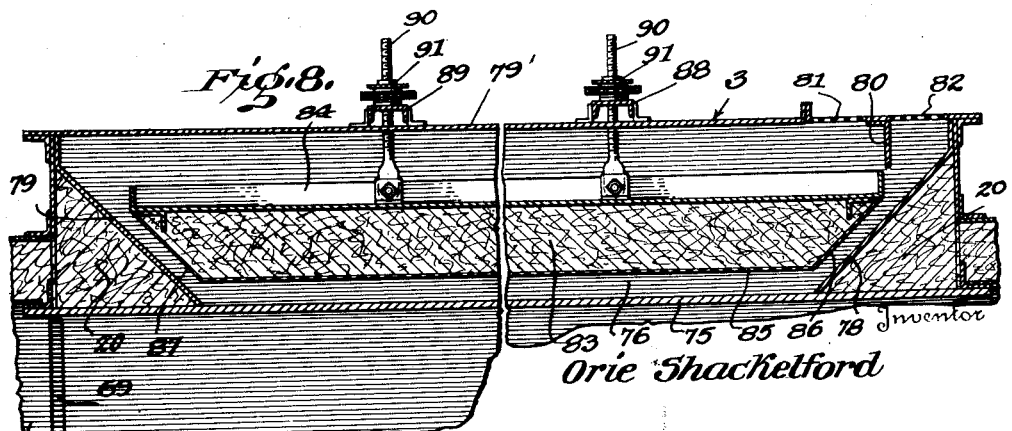
Orie Shackelford

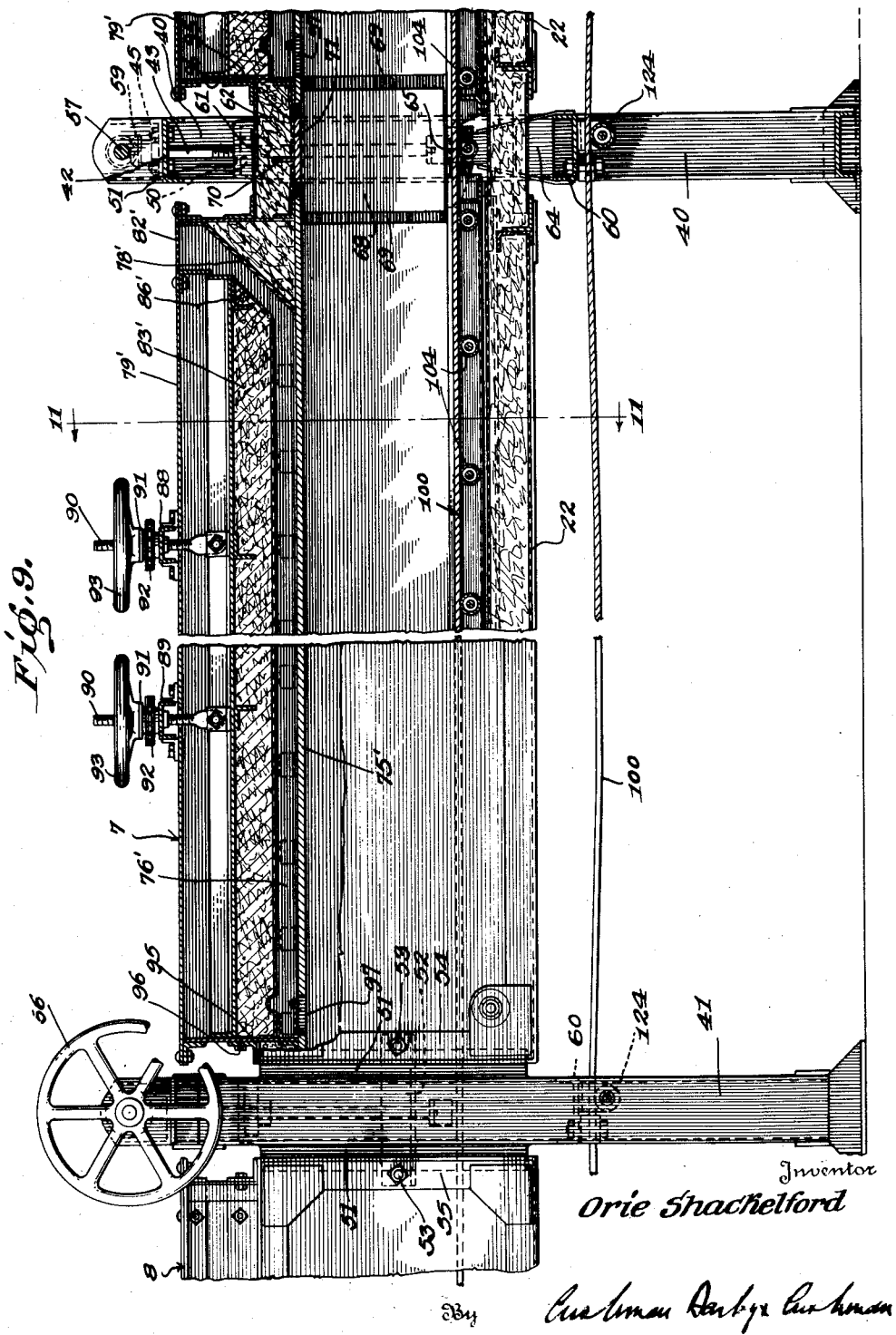

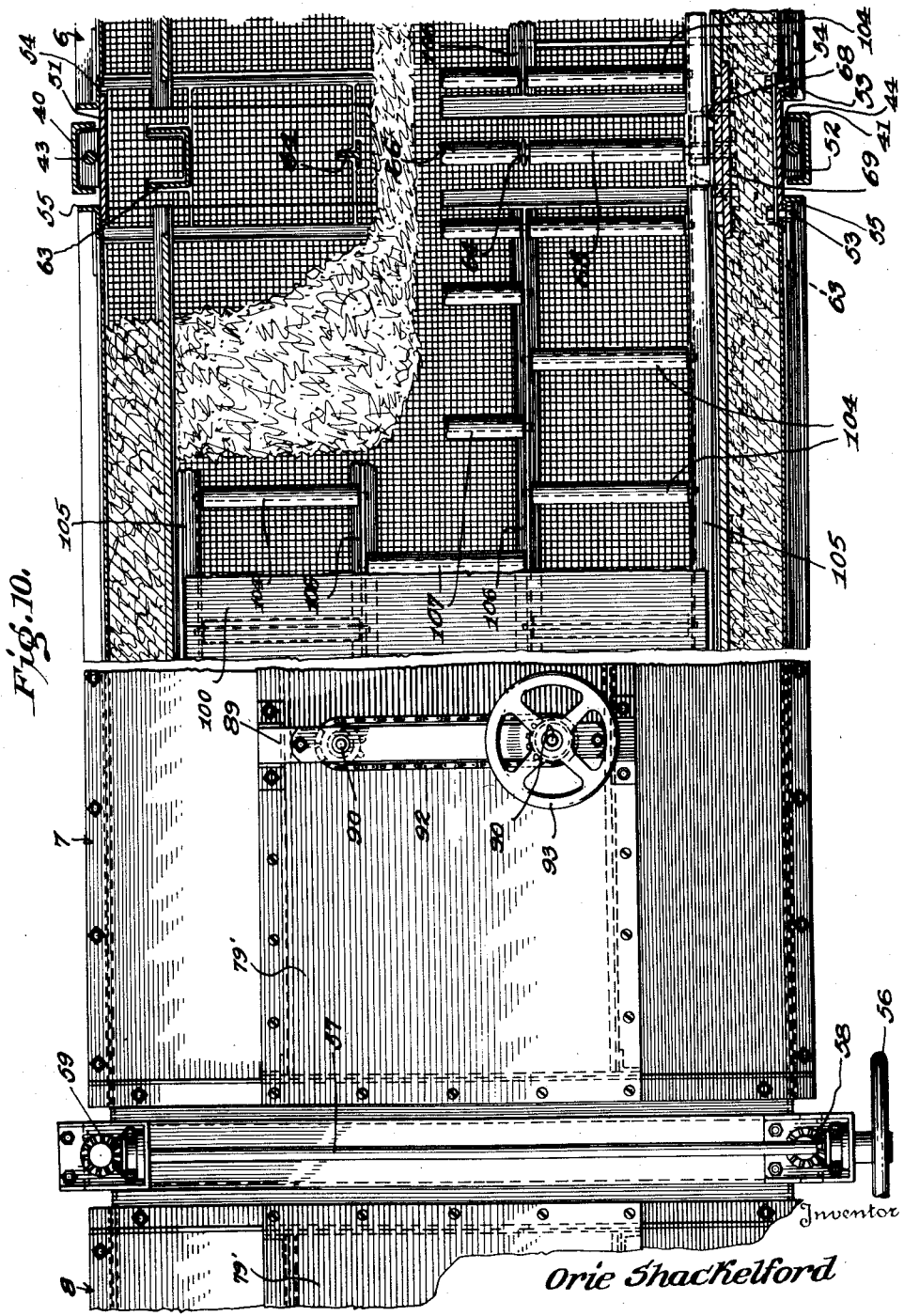

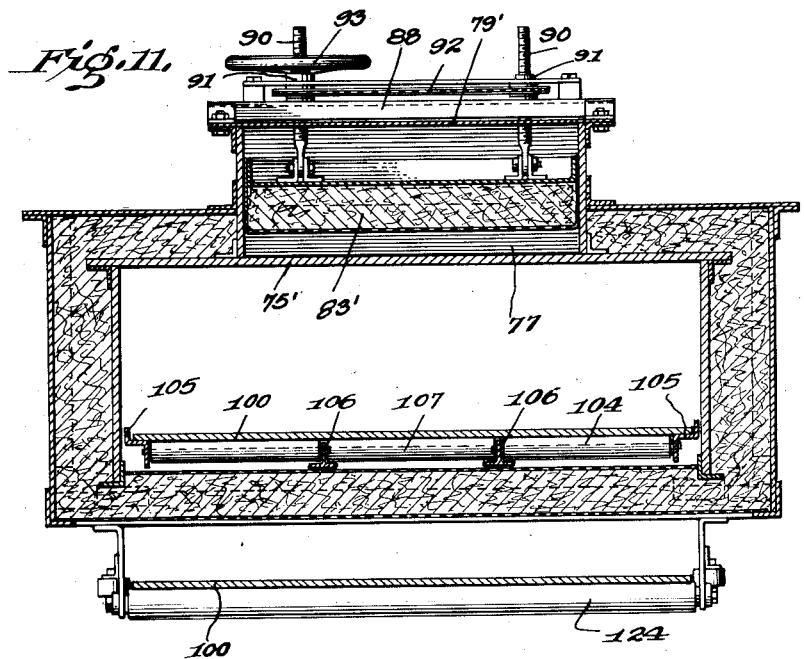
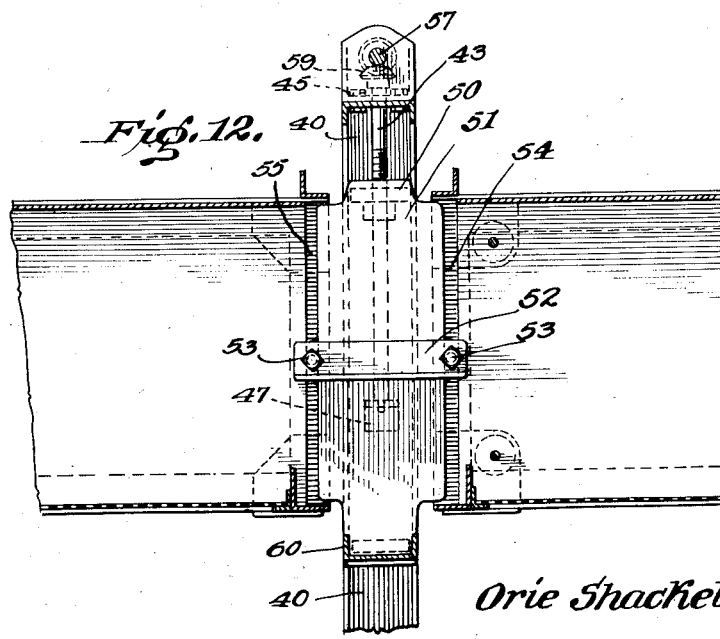

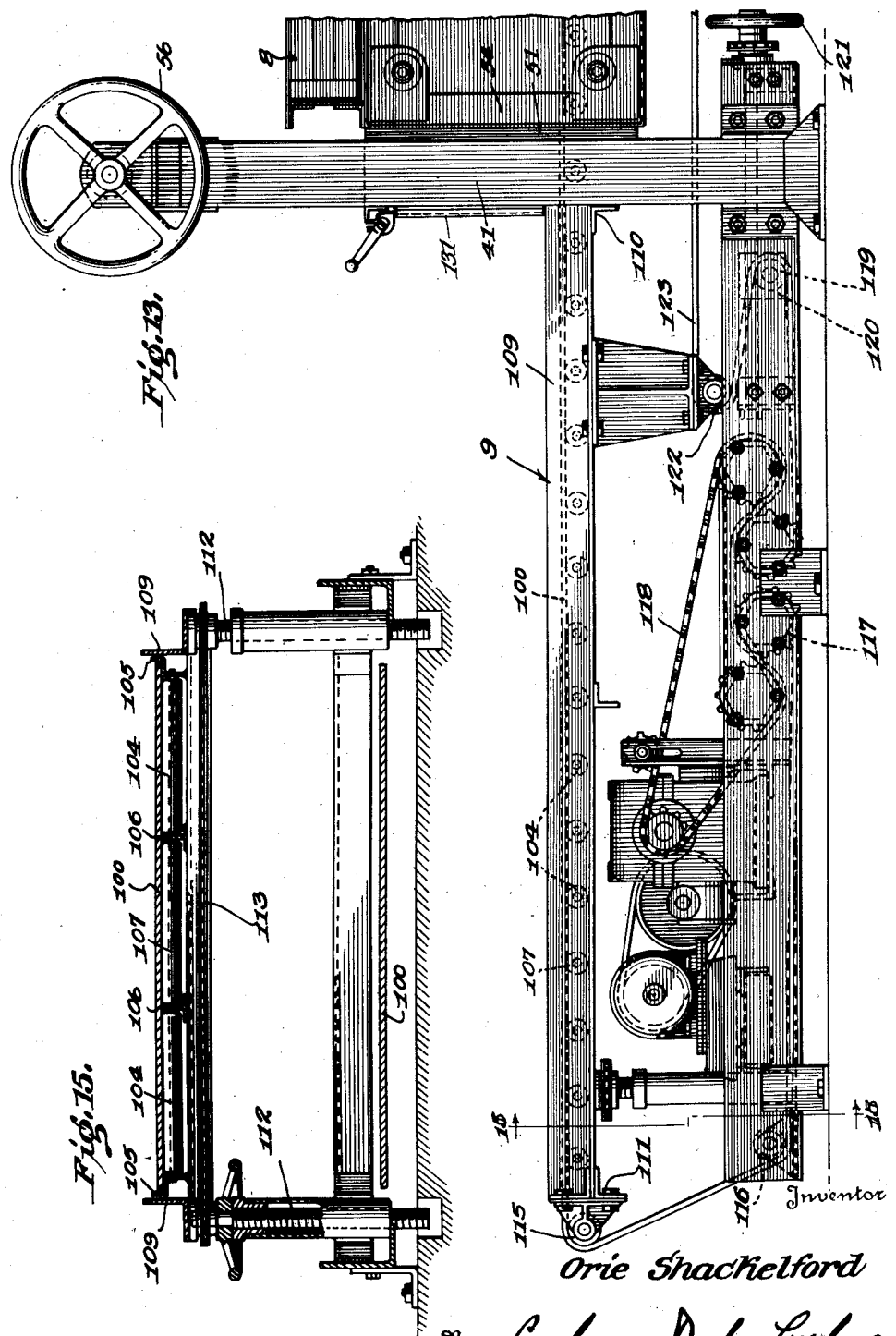

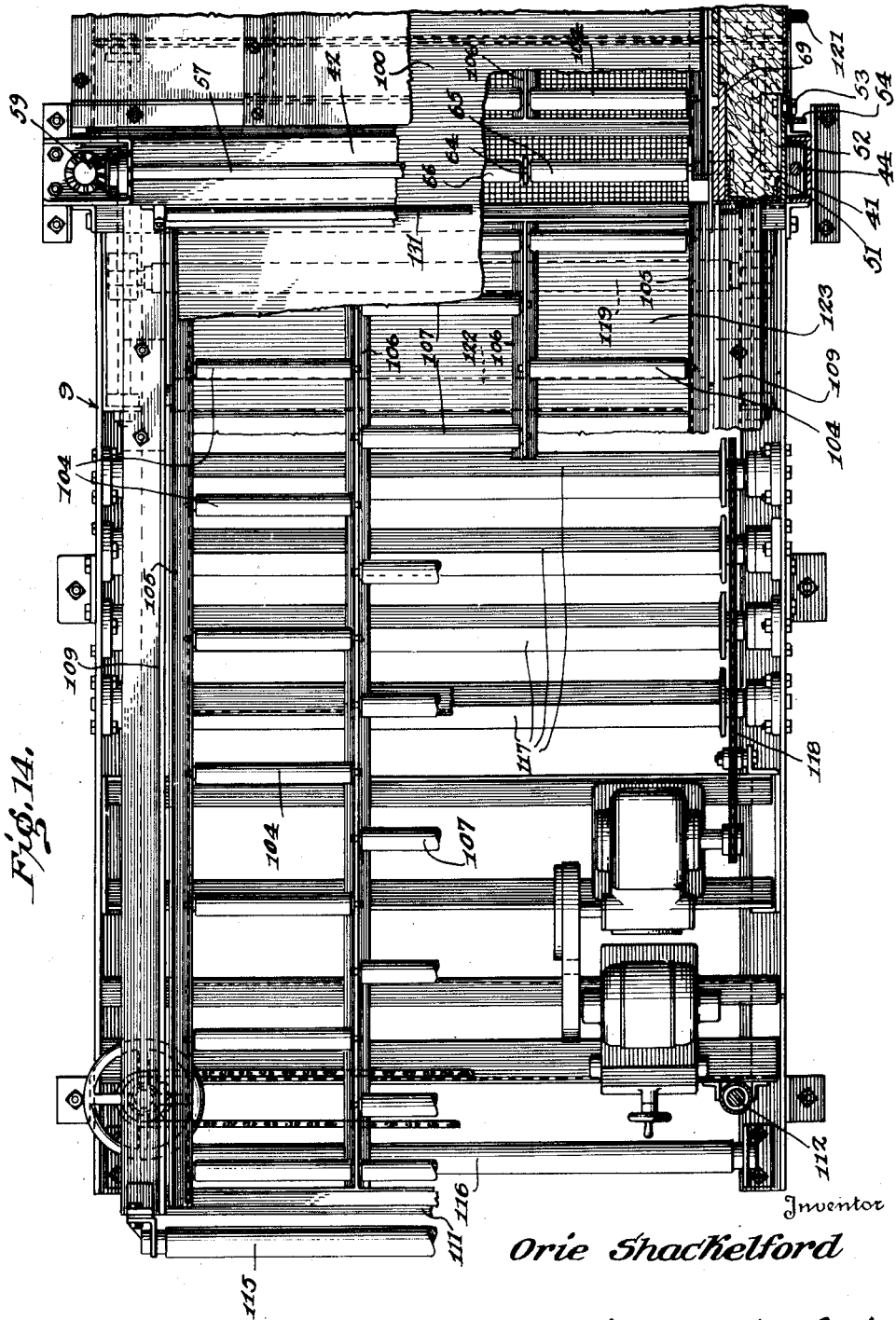

Patented Apr. 16, 1940

2,197,440

UNITED STATES PATENT OFFICE 2,197,440

ANNEALING LEHR AND METHOD OF ANNEALING GLASS ARTICLES

Orie Shackelford, Fairmont, W. Va.

Application March 16, 1937, Serial No. 131,216

35 Claims. (Cl. 49—47)

This invention relates to lehrs for glassware and to new and improved methods of using the same. It is a primary object of the invention to provide an improved method of and apparatus for controlling the temperature throughout different portions of a lehr tunnel. Preferably, this temperature control is effected by a novel combination of means, including means for controlling the elevation and the angle of inclination of various sections of the lehr, means for controlling the conduction of heat through a wall of the lehr, means for controlling the flow of convection currents adjacent to or through that wall, and variable heating means associated with the hot end of the lehr.

Under certain conditions, the lehr of this invention may be operated as a fuelless or ware heated lehr, while under other conditions it may be operated along more conventional lines, and for this purpose, electrical heating means are preferably provided to elevate the temperature of the ware at the entrance end of the lehr.

The lehr is preferably composed of a plurality of sections linked together in end to end relationship and mounted for relative pivoting movement, to change their relative elevations and angles of inclination. The hot end of the lehr is at a higher level than the cold end and the intermediate sections are mounted for adjustment at desired levels therebetween. By changing the relative positions of the various sections, the flow of convection currents from the lower, cold end to the higher, hot end may be accurately controlled. As far as I am aware, I am the first to provide a lehr in which individual sections are linked together for relative movement to permit an adjustment of their elevations and angles of slope.

The invention further comprises means for controlling the transfer of heat from the lehr tunnel to external atmosphere. Preferably, this control is affected by means of movable bodies of heat insulating material associated with the ceiling of the lehr tunnel.

In the accompanying drawings, a specific embodiment of the invention is disclosed, but it must be understood that the invention was not limited to the details of construction shown therein, since the drawings are illustrative only, and are not restrictive of the invention.

In the drawings,

Figure 1 is a diagrammatic, side elevational view of a lehr.

Figure 2 is a side elevation of the hot end.

Figure 3 is a longitudinal vertical sectional view of the structure of Figure 2.

Figure 4 is a transverse section on line 4—4 of Figure 3.

Figure 5 is a fragmentary horizontal section of Figure 4.

Figure 6 is a detail of a portion of the joint between two sections of the lehr.

Figure 7 is a vertical transverse sectional view through the joint between two sections.

Figure 8 is a fragmentary longitudinal section showing the temperature control means for one type of section.

Figure 9 is a longitudinal sectional view, partly in elevation, showing a plurality of sections.

Figure 10 is a top view, partly in plan and partly in horizontal section.

Figure 11 is a transverse section on line 11—11 of Figure 9.

Figure 12 is a longitudinal section on line 12—12 of Figure 7, with the heat insulating material removed.

Figure 13 is a side elevation of the discharge end of the lehr.

Figure 14 is a top view, partly in section and partly in elevation, with certain parts broken away for the sake of clarity, showing the discharge end of the lehr and the belt driving means.

Figure 15 is a transverse section on line 15—15 of Figure 13.

The lehr comprises a plurality of independent sections 1 to 8 linked together in a manner hereinafter described and preferably arranged to provide a downwardly inclined tunnel leading from the higher, hot end section 1 downwardly to the discharge platform 9. One or more sections adjacent the hot end of the lehr may be mounted in fixed relation to the floor, and in the accompanying drawings, two sections 1 and 2 are shown as being permanently secured upon legs 10. These sections are preferably provided with heating means, of any approved type, such for instance, as electric heating elements 11, 12 and 13. The heating elements are connected by conductors 14 to a cable 15 and appropriate circuit makers and breakers are preferably provided, whereby various elements and combinations of elements may be rendered active or inactive, as desired. The electric circuit for controlling the action of the heating elements is not a part of the invention of the present application and therefore is not disclosed here.

The heating elements may be arranged in any desired manner in the section or sections at the hot end of the lehr. As shown in Figure 3, the first section 1 is provided with heating elements adjacent the floor and ceiling of the lehr and the second section 2 has the elements 13 disposed on the floor only. The particular disposition of the elements is unimportant and may be varied within wide limits according to the judgment of the lehr operator.

The various sections of the lehr are made up of a steel skeleton framework, a plurality of slabs of sheet material, and fibrous heat insulating material such as asbestos or mineral wool. The section 1 comprises horizontal angle irons 16 and 17, bolted or welded to similar vertical strips 18, secured to or constituting continuations of the legs 10. Transverse angles 19 are secured to the joints between the vertical and horizontal frame members, so that a box like skeleton frame is provided. The walls are made up of any suitable sheathing and a packing of mineral wool or the like. The sheet material membranes 21 forming the top and sides of the section may be formed of sheet steel, fibre board, asbestos board, or the like, or on the other hand, they may be formed of metal lath covered with heat insulating cement or plaster. A construction of the later type is diagrammatically represented at 22 in the several figures.

In addition to the outer framework comprising angle members 16, 17, 18 and 19, the section 1 also comprises an inner frame, made up of longitudinal angle members 23 and 24 and transverse members 25 and 26. This inner frame serves to support the floor and ceiling of the lehr, and the various heating elements and the like.

The section 2 is constructed in a similar manner. The heating elements are disposed in recesses 27 in the floor of the section, and a body of insulating material 28 is disposed therebelow. Preferably, the section 2 is provided with means associated with its top wall for controlling the extraction of heat from the section, as will be described below.

The vertical end frame members 29 of the section 2 are bolted or otherwise secured to vertical posts 30, as shown at the left in Figure 2. Thus, the sections 1 and 2, are secured together and are permanently supported at a desired level and a fixed angle of inclination with respect to the floor. As shown in the drawings, these sections are horizontally disposed, but, if desired, they may be mounted at a desired angle of inclination with respect to the horizontal.

The section 3 is of somewhat different construction from the sections 1 and 2 and is supported by the vertical posts 30 for pivoting movement with respect thereto about a horizontal axis, defined by bolts or pins 31. The bolts 31 extend through apertures in the vertical end frame members 33 and plates 34 carried by the posts 30. Thus, when the remote end of the section 3 is raised and lowered, the section may pivot about the horizontal axes of the pivot pins 31.

One of the link connections between a pair of sections, and the means for raising and lowering the adjacent ends of a pair of sections will now be described. Since all of the movable connections between the sections are substantially the same, the description of one will suffice.

Referring to Figure 7, a pair of vertical supporting posts or standards 40 and 41 are joined at their upper ends by a horizontal cross member 42. These posts are preferably formed of structural steel channel members. A pair of vertically disposed screw shafts 43 and 44 are disposed in the channels in the vertical members and journalled at their upper ends at 45 and 46 respectively and at their lower ends in angle plates 47 and 48. A nut 49 is threaded on each shaft and disposed below an apertured lug 50 associated with a vertical supporting plate 51. Referring to Figure 12, the inner face of the vertical plate 51 carries a horizontally disposed angle strip 52, provided with apertures adjacent its ends, receiving bolts 53. These bolts extend through the vertical end frame members 54 and 55 of the outer skeleton frame of the adjacent lehr sections. These bolts serve as the sole supports for the ends of the sections and carry the entire weight of the lehr tunnel, the conveying means and the ware being annealed. Each section may pivot about the horizontal axis of its supporting bolts, when the plate 51 is raised and lowered by means of the vertically disposed screw and nut construction. Rotation may be imparted to the screw shafts 43 and 44 for this purpose by hand wheel 56, transverse shaft 57 and interengaging pinions 58 and 59.

Between each pair of movable lehr sections, there is provided a short connecting or coupling section of special construction, adapted to permit relative movement of the sections coupled thereto. These short sections are carried by the vertically movable plates 51. As shown in Figures 7, 9 and 12 they are made up of spaced, inner and outer frames which are generally similar to the other sections. The outer frame comprises the side plates 51, a transverse bottom channel member 60 supported thereby and a top piece which, as shown in Figure 9, may be in the form of lapped plates 61 and 62. Projecting upwardly from the lower channel member 60 are a plurality of supporting elements 63 and 64. As shown in Figure 10, the members 63 are of channel section while the members 64 are of T-section. These supports carry the lehr belt rolls 65, 66 and 67, hereinafter described which are disposed in transverse alignment in the short coupling sections. Also, the supports 63 carry the lapped inner side wall members 68, and 69 as shown in Figures 7 and 10. The transverse inner frame member 70 assists in supporting the ceiling plate 71.

It should be noted that the connection between the adjacent elongated tunnel sections and the short coupling sections is such that relative movement is permitted. The vertical edges of the plate 51 lap the adjacent edges of the vertical frame members 54, 55. Likewise, the outer top plates 61 and 62 are disposed in over-lapped relation to permit slight sliding movement. This construction is carried out throughout all adjacent inner and outer wall members.

In Figures 3 and 8 means are shown for controlling the extraction of heat from the lehr tunnel by conduction through the ceilings of the sections 2 to 5 inclusive. The ceiling 75 may be constructed of sheet metal, asbestos board (Transite), expanded metal lath and heat insulated cement, or any other suitable material. Above the ceiling 75 a chamber 76 is provided in the top wall of the section. This chamber overlies a central portion of the lehr longitudinally of the section, as indicated at 77 in Figure 11. Although Figure 11 is a cross section through one of the sections 6, 7 or 8, the construction of the top wall is the same, except as hereinafter pointed out. As shown in Figure 8, the ends of the chamber 76 are defined by inclined walls 78 and 79, and the space therebelow is filled with suitable insulating material 20, of the character previously described. The top of the chamber 76 is closed by a roof sheet 79' provided with a depending flange member 80 and having a plurality of perforations 81 and 82 adjacent thereto.

Disposed within the chamber 76, there is a vertically movable body of heat insulating material 83. This member is preferably in the form of a rigid slab or pad, comprising an upper framework 84 and a lower sheet like covering 85. The ends of the member 83 are inclined as at 86 and 87 to provide surfaces, complemental to the inclined surfaces 78 and 79.

The opposite ends of the insulating pads 83 may be adjustably raised and lowered. Transverse supporting channel members 88 and 89 carry four shafts 90, threaded in nuts 91 and connected at their lower ends to the upper frame 84, as disclosed in Figures 8, 9 and 11. The pairs of nuts 91 at opposite ends of each section are interconnected by a sprocket chain 92 (Figure 11) for rotation in unison by a hand wheel 93 to raise or lower the adjacent end of the insulating body 83. Thus, the vertical position and the angle of inclination of each insulating member may be varied at will.

When the parts are in substantially the position shown in Figure 8, heat from the ware in the lehr will be transmitted by conduction through the ceiling 75. An air current will be set up in the chamber 76. Cold air from the outside will flow downwardly through the apertures 81 thence lengthwise of the chamber above the insulating member, downwardly between the inclined walls 79 and 87, and thence longitudinally over the hot ceiling 75. The flow of air along this path is established by reason of the fact that the temperature of the air in the chamber 76 above the ceiling 75 is relatively high, while the air in the chamber above the insulating member is relatively cold. The hot air, of course, will tend to rise and the cold air will tend to flow downwardly. Since the most direct outlet for the hot air is upwardly toward the right, between the inclined surfaces 86, 78 and through the apertures 82, the air will flow in that direction. Likewise, the relatively cool air above the insulating member 83 will flow toward the left and downwardly between the inclined walls 79, 87, since the flange member 80 substantially blocks access to the lower chamber at the other end of the insulating member. The tendency of the hot air to flow toward the left and to rise at that end is restrained because of the circuitous path it would have to follow before it could escape to the outside. The air naturally follows the more direct route. This air current will remove heat by convection and will carry it upwardly between the inclined surfaces 78 and 86 and then outwardly through the perforations 82. The degree of conduction through the ceiling 75 can be accurately controlled by moving the body of heat insulating material 83 into and out of contact with its upper surface. The volume of the convection currents, and consequently the amount of heat extracted can be varied by changing the cross sectional area of the passage formed between the hot ceiling and the body of heat insulating material. Thus, an accurate temperature control is effected.

The structure of the top wall of lehr sections 6, 7 and 8 is slightly different from that heretofore described. Referring to Figure 9, it will be seen that the body of heat insulating material 83' is provided with an inclined wall 86' at one end, cooperating with an inclined chamber wall 78' in substantially the same manner as previously described. The other end of the body 83' however is squared as indicated at 95 and is disposed in fairly tight sliding contact with the squared end 96 of the chamber 76'. In this embodiment, the ceiling 75' is provided with one or more apertures 97 adjacent its rear end. The roof wall 79' which defines the top of the chamber is provided with apertures 82' at the front end of the section. This construction permits the extraction of heat by direct convection through the apertures 97, along the space above the ceiling 75 and outwardly through the apertures 82'. Of course, additional heat is extracted by conduction through the ceiling 75. Although this construction is preferred for the fast cooling sections of the lehr, it can be used for all of the sections, or, a top wall construction similar to that shown in Figures 3 and 8 may be used throughout the lehr, for both the annealing range and the fast cooling range.

Although any suitable means may be used for conveying the ware through the lehr, a wire mesh belt 100 of conventional type is preferred. Various means for supporting and driving the belt may be substituted for the preferred form disclosed in the accompanying drawings, and the invention is in no sense limited to the features now to be described. Referring to Figure 3, the belt travels upwardly at the front end of the lehr over a lower transverse idler roll 101 and over a front roll 102, supported by flanges 103. In the lehr section proper, the belt is supported upon rolls 104, appropriately spaced apart and journalled in longitudinally extending side supports 105 of Z-section as shown in Figure 11. Preferably, each roll extends only about one-third of the width of the belt. The ends of the rolls 104 adjacent the center of the lehr are journalled in the upstanding flanges of T-section bars 106. As shown in Figure 10, the rolls 104 adjacent the sides of the lehr tunnel are offset or staggered with respect to the rolls 107 at the center of the tunnel. This construction tends to reduce the warping of the rolls to a minimum and thereby positively effects their turning and also prevents sagging of the lehr belt between the rolls. The rolls which support the belt in the coupling sections between the elongated sections, however, are preferably disposed in alignment.

The lehr belt extends through the several sections 1—8 and outwardly upon the platform 9 at the discharge end. This platform comprises side members 109 and transverse end members 110, 111, supported for vertical movement with the section 8. At its rear end, the platform is supported by a threaded screw and nut construction 112 as shown in Figure 15. A sprocket chain 113 serves to rotate the nuts in unison so that both sides of the platform are moved simultaneously. The rolls 104 and 107 associated with the platform are spaced and supported in substantially the same manner as previously described. The belt is trained about an end roll 115 and then downwardly over an idler 116. The belt follows a serpentine path around a plurality of hexagonal driving rolls 117, all of which are driven by a chain 118. An adjustable tension roll 119 is journalled at its ends in a longitudinally slidable frame 120, the position of which may be controlled by a hand wheel 121.

The belt passes from the tension roll 119 over an idler 122 and then starts on its return stretch as indicated at 123. The idler rolls 124 on the return stretch are supported by the bottom cross channel members 60 associated with each coupling sections between the main lehr sections, as is shown in Figures 7 and 9. Thus, when the couplings are raised and lowered, to change the angle of inclination or the elevation of the lehr sections, the supports for the idler rolls 124 and the return stretch of the conveyor will be correspondingly raised and lowered.

The details of construction of the driving mechanism shown in Figure 13, and the relative disposition of the driving motor and speed reduction mechanism need not be described in detail herein, since substantially the same subject matter is disclosed and claimed in my prior copending application, Serial No. 37,513 filed August 23, 1935, now Patent 2,074,595, March 23, 1937.

At the front end of the lehr where the belt travels upwardly over the roller 100, an insulated hood 130 is positioned. An adjustable gate 131 is mounted in an opening between the hood and the top wall of the first lehr section. The vertical position of the gate may be adjusted so that its lower edge closely approaches the tops of the bottles which will be annealed in the lehr. An additional gate 132 is positioned in the tunnel near the discharge end of the first section. This second gate is pivoted on a horizontal shaft 133 for movement between the dotted and full line positions in Figure 3. A suitable handle 134 and quadrant 135 positioned on the outside of the lehr (Figure 2) serves to determine the position of the gate 132. These two gates assist in preventing undesirable longitudinally flowing currents of air in the lehr tunnel.

The hood 130 is constructed and arranged to receive a lehr stacker of the type shown in my copending application, Serial No. 131,215, filed concurrently herewith, and allowed July 27, 1939.

At the discharge end of the lehr, an adjustable curtain or gate 131 is provided to regulate the volume of air permitted to flow into the outlet end, then further to meander through chambers 76 to effect the gradual cooling of the ware as it is conveyed through the lehr upon conveyor belt 100 for the annealing thereof.

In the operation of the lehr of the present invention, articles of glassware, such as bottles or jars are transferred by an appropriate mechanism to the lehr belt 100 at a point adjacent the roll 102. If a stacker of the type referred to above is used, the bottles will be placed on the lehr belt in transversely disposed rows, the bottles in each row being longitudinally staggered with respect to the bottles in adjacent rows. The first section of the lehr ordinarily will be heated by the heating elements 11 and 12, but in many cases, after the lehr has been in operation for a substantial period of time and has become sufficiently heated, the elements 11 and 12 may be disconnected, and the lehr will then act as a self-heating lehr.

The bottles will be maintained at a sufficiently high temperature in the hot sections of the lehr to relieve all stresses and strains in the wall structure of the articles. Throughout the sections 3, 4 and 5, which constitute the critical zone in the annealing process, the ware will be subjected to a gradually diminishing temperature. This portion of the annealing cycle is usually termed the "soaking range" or the "annealing range." During the course of its travel through the last sections, the ware will be relatively rapidly cooled.

The desired degrees of temperature are maintained in the various sections by adjusting the positions of the several heat insulating bodies 83 and 83'. Also, the angles of inclination of the various sections can be changed to effect a similar result. If a particular section is disposed upon a relatively steep incline, convection currents will carry the heat upwardly through that section more rapidly than through an adjacent more nearly horizontal section. By raising and lowering the different sections, any desired temperature curve through the various sections can be provided. Thus, great flexibility in the operation of the lehr for annealing different types of glassware can be accomplished.

The coupling sections between the adjustable sections constitute miniature soaking zones where the temperature of the ware remains substantially constant, since no means for positively cooling those coupling sections are provided. Thus, the ware will be reduced in temperature a predetermined number of degrees during its passage through a particular section. During its passage through the next coupling section, the ware will be maintained at the temperature to which it was reduced in the preceding section. As it moves into the next positively cooled section, the ware will be further reduced in temperature, and the extraction of heat will again be arrested when the ware moves through the next succeeding coupling section. The temporary termination of the extraction of heat from the ware during its passage through the lehr results in a novel and highly effective annealing method, since it permits an equalization of temperatures throughout all portions of the wall structure of the ware and the elimination of all internal stresses.

It must be understood that the present invention is not limited to the details of construction shown in the accompanying drawings and described above, but includes all devices and methods coming within the scope of the appended claims or their equivalents.

I claim:

1. An annealing lehr for glassware, comprising a plurality of insulated sections arranged end to end and providing a horizontally elongated annealing tunnel, means for connecting the adjacent ends of adjacent sections for independent angular movement of the sections relative to each other, means for supporting the ends of said sections, and means for adjusting the vertical position of said supporting means to vary the angles of inclination of said sections with respect to each other.

2. An annealing lehr for glassware, comprising a plurality of insulated sections arranged end to end and providing an elongated annealing tunnel, means for supporting said sections adjacent their ends, a pivotal connection between said sections and said supporting means, and means for adjusting the vertical position of said supporting means to vary the angle of inclination of the sections by pivotal movement between the sections and said supporting means, the adjustment of said supporting means serving to vary the vertical curve of the annealing tunnel longitudinally of the lehr.

3. An annealing lehr for glassware, comprising a plurality of insulated sections arranged end to end and providing an elongated annealing tunnel, means for supporting certain spaced sections for vertical movement, pivotal connecting means for supporting the sections adjacent said certain sections, means for individually adjusting the vertical position of said certain sections independently of each other, said adjusting means serving to change the resulting angle of inclination of the sections, to vary the vertical curve of the annealing tunnel longitudinally of the lehr.

4. An annealing lehr for glassware, comprising a plurality of insulated sections arranged end to end and providing a horizontally elongated annealing tunnel, means for connecting the adjacent ends of adjacent sections for independent angular movement of the sections relative to each other, and means for varying the temperature in the tunnel in different sections, said means comprising means for elevating certain sections with respect to other sections, and for varying the angles of inclination of certain sections with respect to other sections.

5. An annealing lehr for glassware, comprising a plurality of insulated sections arranged end to end and providing an elongated annealing tunnel, spaced standards adjacent the meeting ends of the respective sections, vertically adjustable supporting members associated with said standards, pivotal connecting means between said members and the adjacent ends of said sections, and means for moving said members vertically, to vary the angle of inclination of the adjacent sections and to regulate the vertical curve of the annealing tunnel longitudinally of the lehr.

6. An annealing lehr for glassware, comprising a plurality of insulated sections arranged end to end and providing an elongated annealing tunnel, spaced supporting posts adjacent the meeting ends of the respective sections, vertically adjustable hangers carried by said posts, pivotal connecting means between said hangers and the adjacent ends of said sections, and means for moving said hangers vertically, to vary the angle of inclination of the adjacent sections and to regulate the vertical curve of the annealing tunnel longitudinally of the lehr.

7. An annealing lehr for glassware, comprising a plurality of insulated sections arranged end to end and providing an elongated annealing tunnel, a section adjacent the hot end of the lehr being fixed in elevation and disposed on a substantially horizontal plane, the next section being pivotally connected thereto for limited oscillating movement about a horizontal axis, whereby its angle of inclination may be varied, and the other sections being pivotally connected at both of their ends for relative pivoting movement about horizontal axes, and means for varying the elevation and the angles of inclination of said other sections to vary the vertical curve of the annealing tunnel longitudinally of the lehr.

8. An annealing lehr comprising a plurality of tunnel sections arranged end to end, said sections comprising a fixed horizontal section disposed at a relatively high elevation at the hot end of the lehr, a section at a lower elevation at the cold end of the lehr, a plurality of intermediate sections, means for connecting the adjacent ends of adjacent intermediate sections for independent angular movement of said sections relative to each other, and means for adjusting the positions of said intermediate sections as to their elevation and relative angles of inclination, whereby the vertical curve of the annealing tunnel between the elevated hot end and the lower cold end can be adjusted for varying annealing curves.

9. A tunnel lehr for annealing glassware comprising a plurality of relatively movable sections assembled end to end and providing a horizontally elongated annealing tunnel, means for connecting the adjacent ends of adjacent sections permitting relative angular movement of the sections with respect to each other, and means for varying the relative vertical positions of the ends of said sections and the relative angles of inclination of the sections, to vary the vertical curve of the tunnel longitudinally thereof.

10. A tunnel lehr for annealing glassware comprising a plurality of elongated sections and a plurality of short connecting sections interposed therebetween, the first mentioned sections being pivotally connected to and supported by the short sections, and means for moving the short sections vertically to change the angles of inclination of the elongated sections connected thereto, thereby to change the vertical curve of the annealing tunnel longitudinally thereof.

11. A tunnel lehr for annealing glassware comprising a chain of tunnel sections linked together on horizontal pivoting axes, and means for varying the vertical positions of the link connections to change the curve of said chain of sections.

12. An annealing lehr for glassware comprising a plurality of sections arranged end to end and providing an elongated annealing tunnel, an elongated, flexible, ware carrying conveyor belt extending through the tunnel, means connecting and supporting the adjacent ends of adjacent sections for joint vertical movement and for relative pivoting action to change the angular relation of the sections to each other, means for supporting said belt in said sections for travel therethrough, said connecting and supporting means serving to maintain the adjacent ends of the sections in substantial alignment, whereby the belt, while carried by its supporting means, may change its angle of travel from one section to another.

13. An annealing lehr for glassware comprising a plurality of sections arranged end to end and providing an elongated annealing tunnel, an elongated, flexible, ware carrying conveyor belt extending through the tunnel, means connecting and supporting the adjacent ends of adjacent sections for joint vertical movement and for relative pivoting action to change the angular relation of the sections to each other, rolls for supporting said belt in said sections for travel therethrough, and additional rolls adjacent the connections between the sections for supporting the belt at those points, said connecting and supporting means serving to maintain the adjacent ends of the section in substantial alignment, and said additional rolls serving to support the belt where it changes its angle of travel from one section to another.

14. Means for supporting the adjacent ends of sections of an annealing lehr, comprising pivotal means connecting the side walls of said sections, a stationary supporting frame, and a vertically disposed screw and nut connection between said pivotal connecting means and said frame, whereby the vertical position of the connecting means and the sections may be changed.

15. Means for supporting the adjacent ends of sections of an annealing lehr, comprising vertical plates, a connection including pivotal means between said plates and the side walls of said sections, a stationary supporting frame, and a vertically disposed screw and nut connection between said frame and said plates, whereby the vertical position of the plates and the sections may be changed.

16. Means for supporting the adjacent ends of sections of an annealing lehr, comprising a vertical plate pivotally connected to and supporting the adjacent side walls of opposite sides of said sections, a frame, a vertically disposed screw and nut connection between said frame and each of said plates, and common operating means for imparting relative rotation in unison to each of said screw and nut connections.

17. An annealing lehr for glassware, comprising a plurality of sections arranged end to end and providing an elongated annealing tunnel, an endless flexible ware carrying conveyor belt having one stretch extending through the tunnel and the return stretch disposed beneath the tunnel, means connecting and supporting the adjacent ends of adjacent sections for vertical movement and for relative pivoting action to change the angular relation of the sections to each other, means for supporting said belt in said sections for travel therethrough, and means carried by said connecting and supporting means and disposed beneath the sections for supporting the return stretch of the conveyor belt.

18. An annealing lehr for glassware, comprising a plurality of sections arranged end to end and providing an elongated annealing tunnel, an endless flexible ware carrying conveyor belt having one stretch extending through the tunnel and the return stretch disposed beneath the tunnel, means connecting and supporting the adjacent ends of adjacent sections for vertical movement and for relative pivoting action to change the angular relation of the sections to each other, rolls for supporting said belt in said sections for travel therethrough, and other rolls carried by said connecting and supporting means and disposed beneath the sections for supporting the return stretch of the conveyor belt.

19. A tunnel lehr comprising insulated side and bottom walls, and a top wall comprising a sheet material inner surface and a body of heat insulating material above said surface, and means for moving said body with respect to said inner surface for varying the heat conductive characteristics of the top wall.

20. In a lehr, a tunnel section comprising insulated side walls, a top wall having a chamber formed therein defined at its bottom by the tunnel ceiling, a body of heat insulating material in said chamber above said ceiling, means for moving said body with respect to the ceiling to provide an air space thereabove, and means for controlling the removal of heat from the ceiling by convection over said space.

21. In a lehr, a tunnel section comprising insulated side walls, a top wall having a chamber formed therein defined at its bottom by the tunnel ceiling, a body of heat insulating material in said chamber above the ceiling, means for moving said body vertically toward and from the ceiling to provide an air space of variable vertical height above the ceiling, and means for controlling the flow of convection currents through said space.

22. In a lehr, a tunnel section comprising insulated side walls, a top wall having a chamber formed therein defined at its bottom by the tunnel ceiling, said chamber having an inclined wall along one margin, a body of heat insulating material in said chamber above said ceiling, said body having a margin adjacent said wall, means for moving said body vertically toward and from the ceiling to vary the size of the air space therebetween, said body margin and said inclined wall serving to open and close said space to atmosphere by the vertical movement of the body, thereby controlling the flow of convection currents from said space.

23. In a lehr, a tunnel section comprising insulated side walls, a top wall having a chamber formed therein defined at its bottom by the tunnel ceiling, said chamber having an inclined wall along one margin, a body of heat insulating material in said chamber above said ceiling, said body having a complemental inclined wall along one margin, means for moving said body vertically toward and from the ceiling to vary the size of the space therebetween, said inclined walls serving to open and close said space to atmosphere by the vertical movement of the body, thereby controlling the flow of convection currents from said space.

24. A tunnel lehr comprising insulated side and bottom walls, and a top wall having a chamber therein formed above the ceiling of the lehr tunnel, a body of heat insulating material disposed in said chamber, and means for moving said body toward and from the ceiling to vary the heat conductivity of the ceiling.

25. A tunnel lehr comprising insulated side and bottom walls, and a top wall having a chamber therein formed above the ceiling of the lehr tunnel and in communication with external atmosphere, a body of heat insulating material disposed in said chamber, and means for moving said body toward and from the ceiling to vary the heat conductivity of the ceiling and to control convection currents in said chamber above said ceiling.

26. In a lehr, a tunnel section comprising insulated side walls, a top wall having a chamber formed therein defined at its bottom by the tunnel ceiling, said chamber having an inclined wall at each of its ends, a body of heat insulating material in said chamber above the ceiling, said body having inclined end walls complemental to the inclined chamber walls, means for moving said body vertically with respect to the ceiling to vary the size of an air space therebetween, said inclined end walls serving to open the space to atmosphere at opposite ends thereof upon vertical movement of said body, to permit the flow of convection currents through said space from end to end.

27. In a lehr, a tunnel section comprising insulated side walls, a top wall having a chamber formed therein defined at its bottom by the tunnel ceiling, said chamber having vertical side walls and an inclined end wall, a body of heat insulating material in said chamber above the ceiling and having vertical side walls in substantially sliding contact with the side walls of the chamber and a complemental inclined end wall, means for moving the body vertically with respect to the ceiling to vary the size of an air space therebetween, said inclined end walls serving to open said space to atmosphere upon vertical movement of the body while the side walls seal the sides of the chamber.

28. In a lehr, a tunnel section comprising insulated side walls and bottom, a top wall having a chamber therein defined along its bottom by the tunnel ceiling, said ceiling having an aperture therethrough communicating with the chamber, said chamber having an inclined wall at one end, a body of heat insulating material in said chamber having a complemental inclined end wall adjacent the aforementioned chamber end wall, and means for moving said body vertically with respect to said ceiling to vary the heat conductive characteristics of the ceiling and to provide a space therebetween for the flow of convection currents through said aperture and said space to atmosphere between said inclined end walls.

29. In a lehr, a tunnel section comprising insulated side walls, a top wall having a chamber therein defined along its bottom by the tunnel ceiling, said ceiling having an aperture therethrough adjacent one end of the chamber, said chamber having an inclined wall at its opposite ends, a body of heat insulating material in said chamber having a complemental inclined end wall adjacent the aforementioned chamber end wall, and means for moving said body vertically with respect to said ceiling to vary the heat conductive characteristics of the ceiling and to provide a space therebetween for the flow of convection currents through said aperture and said space to atmosphere between said inclined end walls.

30. The method of annealing, which comprises conveying heated articles of glassware through a tunnel lehr having a succession of individual cooling zones with miniature soaking zones therebetween, intermittently cooling the articles during their passage through the cooling zones, and intermittently and alternately with said cooling steps, equalizing the temperature throughout the glass structure of the articles during their passage through the miniature soaking zones to remove any strain which may have been created therein during the passage of the said articles through the said cooling zones.

31. The method of annealing articles of glassware which comprises intermittently cooling the articles, and intermittently and alternately with said cooling steps, arresting the cooling, thereby alternately and intermittently affecting substantial equalization of the temperature throughout different points in the wall structure of the articles.

32. The method of annealing articles of glassware which comprises the steps of subjecting the highly heated articles to a cooling atmosphere and thereby extracting heat from the exterior surfaces of the wall structure of the articles, temporarily arresting said surface extraction of heat and permitting the temperature transversely through the wall structure substantially to equalize, then again cooling said exterior surfaces and subsequently again arresting said cooling to equalize the temperature in said wall structure at a lower degree than at the end of the first temperature equalizing step, and repeating the alternate cooling and temperature equalizing steps until the annealing is complete.

33. The method of annealing articles of glassware which comprises conveying articles through an annealing tunnel having a heated atmosphere therein varying from a relatively high temperature at the entrance end to a relatively low temperature at the discharge end, and controlling the temperature in the tunnel at different longitudinal portions thereof by changing the angles of inclination of certain portions relative to other portions, thereby controlling the flow of convection currents in the tunnel.

34. The method of annealing articles of glassware which comprises conveying articles through an annealing tunnel having a heated atmosphere therein varying from a relatively high temperature at the entrance end to a relatively low temperature at the discharge end, and controlling the temperature in the tunnel at different longitudinal portions thereof by changing the angles of inclination and the elevation of certain portions of the tunnel relative to other portions, thereby controlling the flow of convection currents in the tunnel.

35. The method of annealing articles of glassware which comprises conveying articles through an insulated annealing tunnel having a heated atmosphere therein varying from a relatively high temperature at the entrance end to a relatively low temperature at the discharge end, and controlling the temperature in the tunnel at different portions longitudinally thereof by varying the heat-insulating characteristics of the top of the tunnel at certain portions, thereby varying and controlling the conduction of heat from the tunnel to external atmosphere through the top wall of the tunnel.

ORIE SHACKELFORD.